US011978981B2

United States Patent
Cremona

(10) Patent No.: US 11,978,981 B2
(45) Date of Patent: May 7, 2024

(54) CABLE STRAIN RELIEF WITH BANDING PORCH FOR HIGH RADIATION ENVIRONMENT

(71) Applicant: Hamilton Sundstrand Corporation, Charlotte, NC (US)

(72) Inventor: Kevin Cremona, Westfield, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 213 days.

(21) Appl. No.: 17/549,091

(22) Filed: Dec. 13, 2021

(65) Prior Publication Data

US 2023/0187874 A1   Jun. 15, 2023

(51) Int. Cl.
*H01R 13/533* (2006.01)
*H01R 13/502* (2006.01)
*H01R 13/58* (2006.01)
*H01R 13/6593* (2011.01)

(52) U.S. Cl.
CPC ......... *H01R 13/533* (2013.01); *H01R 13/502* (2013.01); *H01R 13/58* (2013.01); *H01R 13/6593* (2013.01)

(58) Field of Classification Search
CPC .... H01R 13/533; H01R 13/502; H01R 13/58; H01R 13/6593; H02G 3/0625; H02G 3/0481; H02G 3/0616
See application file for complete search history.

(56) References Cited

U.S. PATENT DOCUMENTS

| 5,817,980 | A | 10/1998 | Kirma |
| 7,811,132 | B2 | 10/2010 | Carpenter et al. |
| 7,973,250 | B2 * | 7/2011 | Groeller ............... H02G 3/22 248/68.1 |
| 8,313,340 | B2 | 11/2012 | Krueger et al. |
| 8,435,066 | B2 | 5/2013 | Myong et al. |
| 8,597,053 | B2 | 12/2013 | Oh |
| 9,537,279 | B2 | 1/2017 | Penumatcha et al. |
| 10,483,735 | B1 | 11/2019 | Gretz et al. |
| 11,271,379 | B1 * | 3/2022 | Gretz ................... H02G 3/32 |
| 2008/0009173 | A1 | 1/2008 | Carnahan et al. |
| 2009/0283318 | A1 | 11/2009 | Bonga et al. |

FOREIGN PATENT DOCUMENTS

EP   0566090 A1   10/1993

OTHER PUBLICATIONS

European Search Report for Application No. 22211396.1, dated May 2, 2023, 10 pages.

* cited by examiner

*Primary Examiner* — Briggitte R. Hammond
(74) *Attorney, Agent, or Firm* — CANTOR COLBURN LLP

(57) ABSTRACT

An opening shield assembly including a body portion that includes a base plate having a front side and a back side and a passageway portion having a proximal end and a distal end. The passageway portion being connected to the base plate at the proximal end. The body portion also includes a passage extending from the distal end of the passageway portion to the back side of the base plate through the passageway portion and the base plate. The passageway portion is bent between the proximal end and the distal end to form a bend.

11 Claims, 4 Drawing Sheets

CABLE STRAIN RELIEF WITH BANDING PORCH FOR HIGH RADIATION ENVIRONMENT

BACKGROUND

The embodiments herein generally relate to a tubing structure for electrical connections and more specifically, tubing structure for electrical connections in high radiation environments.

Separate electrical components are often kept in separate housings to be protected from a radiation environment, such as, for example, in outer space. At electrical interfaces where signals are brought into or out of the housings, by a non-metallic connector (which does not provide shielding) or by a hole to pass through cables/wires, there is inadequate radiation protection.

BRIEF SUMMARY

According to one embodiment, an opening shield assembly is provided. The opening shield assembly including a body portion that includes a base plate having a front side and a back side and a passageway portion having a proximal end and a distal end. The passageway portion being connected to the base plate at the proximal end. The body portion also includes a passage extending from the distal end of the passageway portion to the back side of the base plate through the passageway portion and the base plate. The passageway portion is bent between the proximal end and the distal end to form a bend.

In addition to one or more of the features described above, or as an alternative, further embodiments may include that the passageway portion further includes: a first portion located at the proximal end. The first portion having a first outer diameter. The passageway portion further includes a second portion located at the distal end. The second portion having a second outer diameter. The passageway portion also includes a third portion located between the first portion and the second portion. The third portion having a third outer diameter that is less than at least one of the first outer diameter and the second outer diameter.

In addition to one or more of the features described above, or as an alternative, further embodiments may include a metallic over braid configured to cover the passageway portion.

In addition to one or more of the features described above, or as an alternative, further embodiments may include that the metallic over braid is configured to cover the wires.

In addition to one or more of the features described above, or as an alternative, further embodiments may include that the metallic over braid is configured to cover the second portion and the third portion.

In addition to one or more of the features described above, or as an alternative, further embodiments may include a band clamp that is configured to compress the metallic over braid onto the passageway portion.

In addition to one or more of the features described above, or as an alternative, further embodiments may include a band clamp that is configured to compress the metallic over braid onto the second portion and the third portion.

In addition to one or more of the features described above, or as an alternative, further embodiments may include that the body portion further includes a slot passing through the body portion to the passage.

In addition to one or more of the features described above, or as an alternative, further embodiments may include that the slot is located in the third portion.

In addition to one or more of the features described above, or as an alternative, further embodiments may include that the second portion has a beveled edge or a chamfered edge at the distal end.

In addition to one or more of the features described above, or as an alternative, further embodiments may include that the second portion has a fourth outer diameter at the distal end. The second outer diameter of the second portion is located where the second portion meets the third portion, and wherein the fourth outer diameter is less than the second outer diameter.

In addition to one or more of the features described above, or as an alternative, further embodiments may include that the bend has a bend radius of about 90°.

In addition to one or more of the features described above, or as an alternative, further embodiments may include that the passageway portion further includes an outward surface and an inward surface, the inward surface defining the passage within the passageway portion. A thickness as measured between the inward surface and the outward surface is constant within the first portion.

According to another embodiment, an electrical component protection assembly is provided. The electrical component protection assembly includes a housing having a housing wall and an opening in the housing wall and an opening shield assembly attached to the housing. The opening shield assembly including a body portion that includes: a base plate having a front side and a back side and a passageway portion having a proximal end and a distal end. The passageway portion being connected to the base plate at the proximal end. The body portion also includes a passage extending from the distal end of the passageway portion to the back side of the base plate through the passageway portion and the base plate. The passageway portion is bent between the proximal end and the distal end to form a bend.

In addition to one or more of the features described above, or as an alternative, further embodiments may include that the passageway portion further includes: a first portion located at the proximal end. The first portion having a first outer diameter. The passageway portion further includes a second portion located at the distal end. The second portion having a second outer diameter. The passageway portion also includes a third portion located between the first portion and the second portion. The third portion having a third outer diameter that is less than at least one of the first outer diameter and the second outer diameter.

In addition to one or more of the features described above, or as an alternative, further embodiments may include a metallic over braid configured to cover the passageway portion.

In addition to one or more of the features described above, or as an alternative, further embodiments may include that the metallic over braid is configured to cover the wires.

In addition to one or more of the features described above, or as an alternative, further embodiments may include that the metallic over braid is configured to cover the second portion and the third portion.

In addition to one or more of the features described above, or as an alternative, further embodiments may include that the opening shield assembly further includes: a band clamp that is configured to compress the metallic over braid onto the passageway portion.

According to another embodiment, a method of assembling an electrical component protection assembly is provided. The method includes that a housing having a housing wall and an opening in the housing wall is obtained. The method also includes that an opening shield assembly is attached to the housing. The opening shield assembly includes a body portion having a base plate having a front side and a back side. The body portion also includes a passageway portion having a proximal end and a distal end. The passageway portion being connected to the base plate at the proximal end. The body portion yet further includes a passage extending from the distal end of the passageway portion to the back side of the base plate through the passageway portion and the base plate. The passage connecting with the opening in the housing wall at the base plate. The passageway portion is bent between the proximal end and the distal end to form a bend.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

As previously noted, separate electrical components are often kept in separate housings to be protected from a radiation environment, such as, for example, in outer space. At electrical interfaces where signals are brought into or out of the housings, by a non-metallic connector (which does not provide shielding) or by a hole to pass through cables/wires, there is inadequate radiation protection. The embodiments described herein seek to provide shielding or protection of the area of the housing where the hole allows cables/wires to pass through and enter and/or leave the housing.

Figure 2:
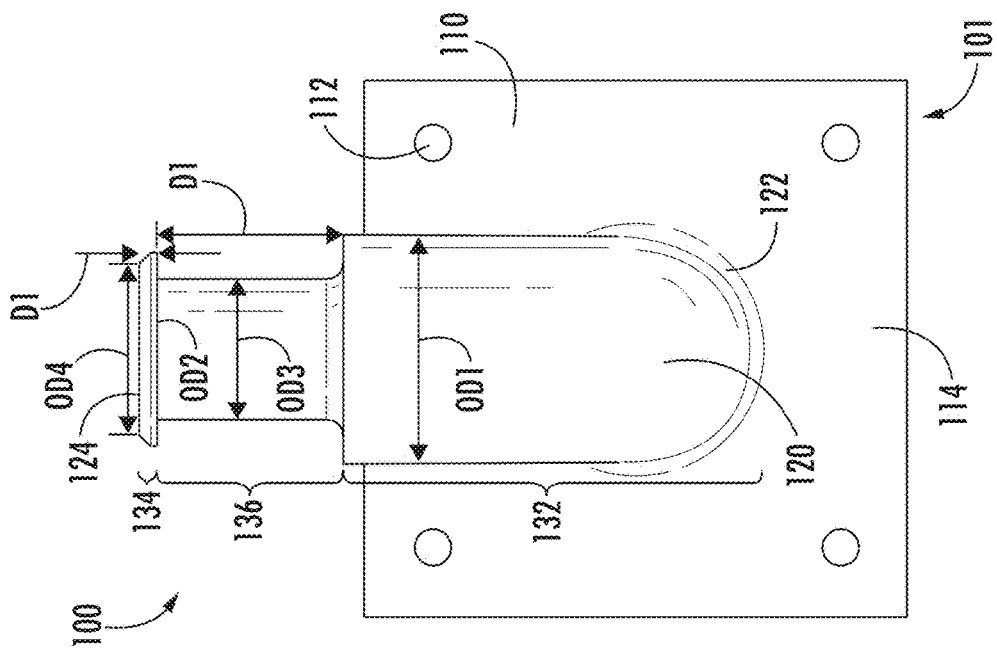
FIG. 2 is a front view of the opening shield assembly of FIG. 1, according to an embodiment of the present disclosure.
Figure 1:
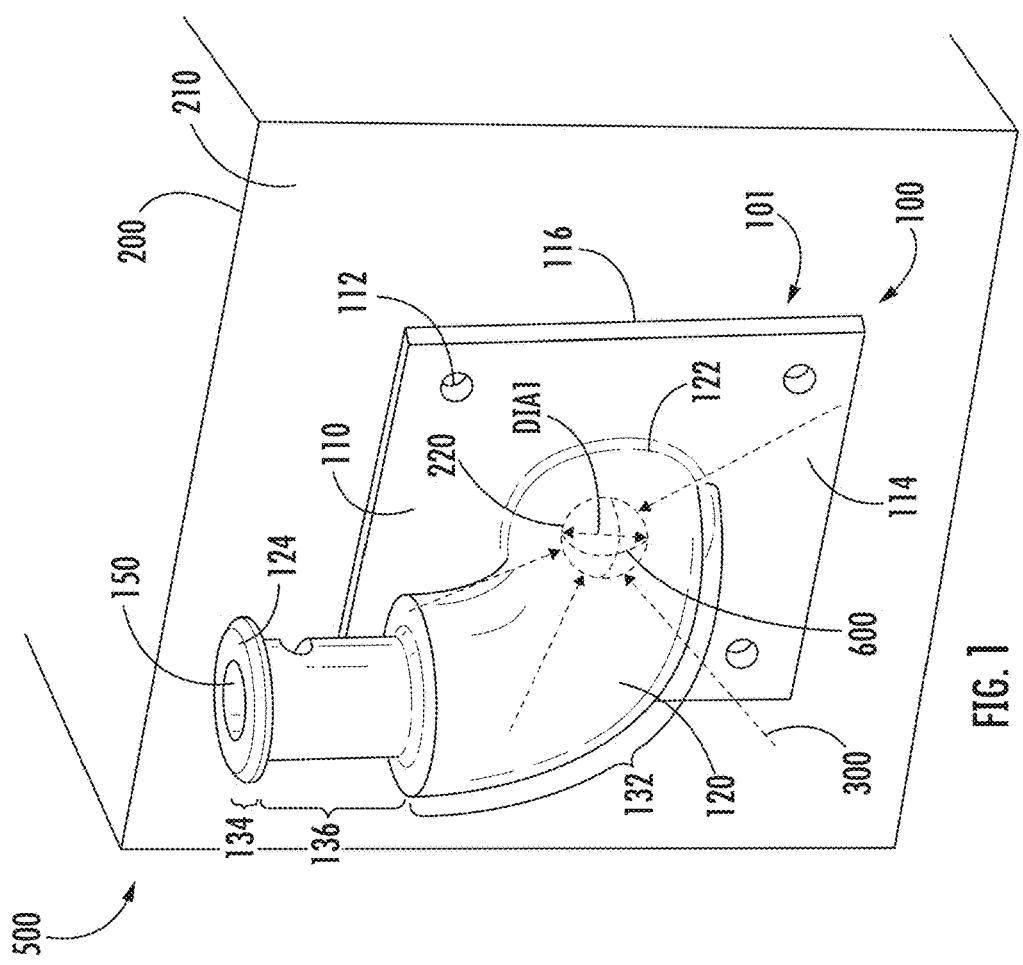
FIG. 1 is a prospective view of an opening shield assembly installed on a housing to form an electrical component protection assembly, according to an embodiment of the present disclosure.

Referring now to FIGS. 1 and 2, a perspective view of an opening shield assembly 100 is illustrated in FIG. 1 and a front view of the opening shield assembly 100 is illustrated in FIG. 2, in accordance with an embodiment of the present disclosure. The opening shield assembly 100 may be composed of a body portion 101. The body portion 101 may include a base plate 110 and a passageway portion 120 connected to and extending from the base plate 110.

The body portion 101 may be formed as a single piece comprising a unitary structure. The body portion 101 may be manufactured or formed via an additive manufacturing technique known to one of skill in the art. In an embodiment, the body portion 101 may be manufactured by growing the structure one layer at a time. In an embodiment, the body portion 101 may be manufactured by powder bed fusion additive manufacturing. Alternatively, the body portion 101 may be assembled by forming the base plate 110 and the passageway portion 120 separately and then securing the passageway portion 120 to the base plate 110 using a weld, an adhesive, or any other attachment mechanism or method.

Alternatively, the body portion may be machined from a single piece of material or multiple pieces of material. The profile or shape of the passageway portion 120 may be adjusted, as necessary, to allow the body portion 101 to be machined from a single piece of material.

The base plate 110 includes a front side 114 and a back side 116 located opposite the front side 114. The proximal end 122 of the passageway portion 120 may be connected to the front side 114 of the base plate 110. The opening shield assembly 100 is configured to attach to a housing 200 at the back side 116 of the base plate 110. The combination of the housing 200 and the opening shield assembly 100 may be referred to as an electrical component protection assembly 500. As aforementioned, the housing 200 may house electronics and comprises a housing wall 210 that protects the electronics inside from electromagnetic interference (EMI) and radio-frequency interference (RFI). The housing wall 210 also provides radiation protection. Additionally, the housing wall 210 may provide thermal sync and structural support in addition to EMI/RFI protection. In an embodiment, the housing wall 210 may be composed of aluminum 6061-T6/T651 or any other suitable material known to one of skill in the art. The housing wall 210 may have a certain thickness of aluminum that provides a desired amount of radiation shielding on a "Depth/Dose" curve.

Alternatively, another component or a combination of components within the housing 200 may provide protection from EMI, RFI, radiation, thermal sync, and/or structural support.

The housing wall 210 may be composed of a material sufficient to protect the electronics inside from EMI, RFI, and total dose radiation. The housing wall 210 may have a sufficient thickness to protect the electronics inside from EMI, RFI, and total dose radiation.

The housing 200 includes an opening 220 in the housing wall 210 that aligns with an opening in the base plate 110 (through-passage 118 (FIG. 3)). The opening 220 allows one or more cables from the electronics to leave the housing 200 and connect to other electronics that may be located in other protective housings via the passageway portion 120. This opening 220 creates a weak point or a vulnerable area for EMI, RFI, and total dose radiation to enter the housing 200 and damage the electronics therein. The opening shield assembly 100 is configured to cover and/or shield the opening 220 to protect the electronics in the housing 200 from EMI, RFI, and total dose radiation, while allowing the cables from the electronics within the housing 200 to exit the housing 200 through a passage 152 (FIG. 3) located within the passageway portion 120.

The opening shield assembly 100 is configured to provide EMI, RFI, and total dose radiation protection from any and all angles through a hemisphere 600 completely covering the opening 220 and external to the housing 210. The hemisphere 600 has an equivalent diameter DIA1 to that of the opening 220. The hemisphere 600 is not present in a structure of the housing 210 but is used to better illustrate the angle of attack by EMI, RFI, and total dose radiation . Therefore, the passageway portion 120 may have a sufficient thickness (T1) and/or be composed of a sufficient material to protect the opening 220 from EMI, RFI, and total dose radiation from any angle 300.

The base plate 110 may also include one or more through-holes 112 extending from the front side 114 to the back side 116. The through-hole 112 is configured to fit an attachment mechanism (not shown) to secure the opening shield assembly 100 to the housing 210. The attachment mechanism may be a bolt, rivet, screw or any other attachment mechanism known to one of skill in the art. The one or more through-holes 112 may be oriented in a symmetric mounting pattern (e.g., a square), such that the opening shield assembly 100 can be rotated in 90 degree increments within having to change the housing 200 or drill more through-holes 112. The increments of rotations may be greater than or less than 90 degrees to allow for more flexibility in orientation of the opening shield assembly 100.

The passageway portion 120 includes a proximal end 122 and a distal end 124. The passageway portion 120 extends from the proximal end 122 to the distal end 124. The passageway portion 120 connects to or intersects with the base plate 110 at the proximal end 122. The passageway portion 120 may be integrally connected to the base plate 110 at the proximal end 122. The passageway portion 120 may be composed of a first portion 132, a second portion 134, and a third portion 136. The first portion 132 may be located at the proximal end 122 and may be referred to as a bend portion or elbow portion. The second portion 134 may be located at the distal end 124 and may be referred to as a collar portion. The third portion 136 may be interposed between the first portion 132 and the second portion 134 and be referred to as a banding porch portion The first portion 132 may have a first outer diameter OD1, the second portion 134 may have a second outer diameter OD2, and the third portion 136 may have a third outer diameter OD3. The first outer diameter OD1 may be greater than the third outer diameter OD3. The second outer diameter OD2 may be greater than the third outer diameter OD3. The second outer diameter OD2 may be less than or equivalent to the first outer diameter OD1. The second outer diameter OD2 may be a maximum outer diameter for the second portion 134 if the second portion 134 has a beveled edge or a chamfered edge at the distal end 124, as illustrated in FIG. 2.

The beveled edge allows a metallic over braid 290 (see FIG. 4) to be easily slid over the second portion 134 and onto the third portion 136. A sharp edge or non-beveled edge may catch and cause damage on the plating on the strands of the shield.

An outer diameter of the second portion 134 may get larger moving away from the distal end 124 towards the third portion 136. The second outer diameter OD2 may be an outer diameter of the second portion 134 where the second portion 134 meets the third portion 136. The second portion 134 may have a fourth outer diameter OD4 at the distal end 124 and then the second outer OD2 where the second portion 134 meets the third portion 136. the fourth outer diameter OD4 may be less than the second outer diameter OD2.

Figure 3:
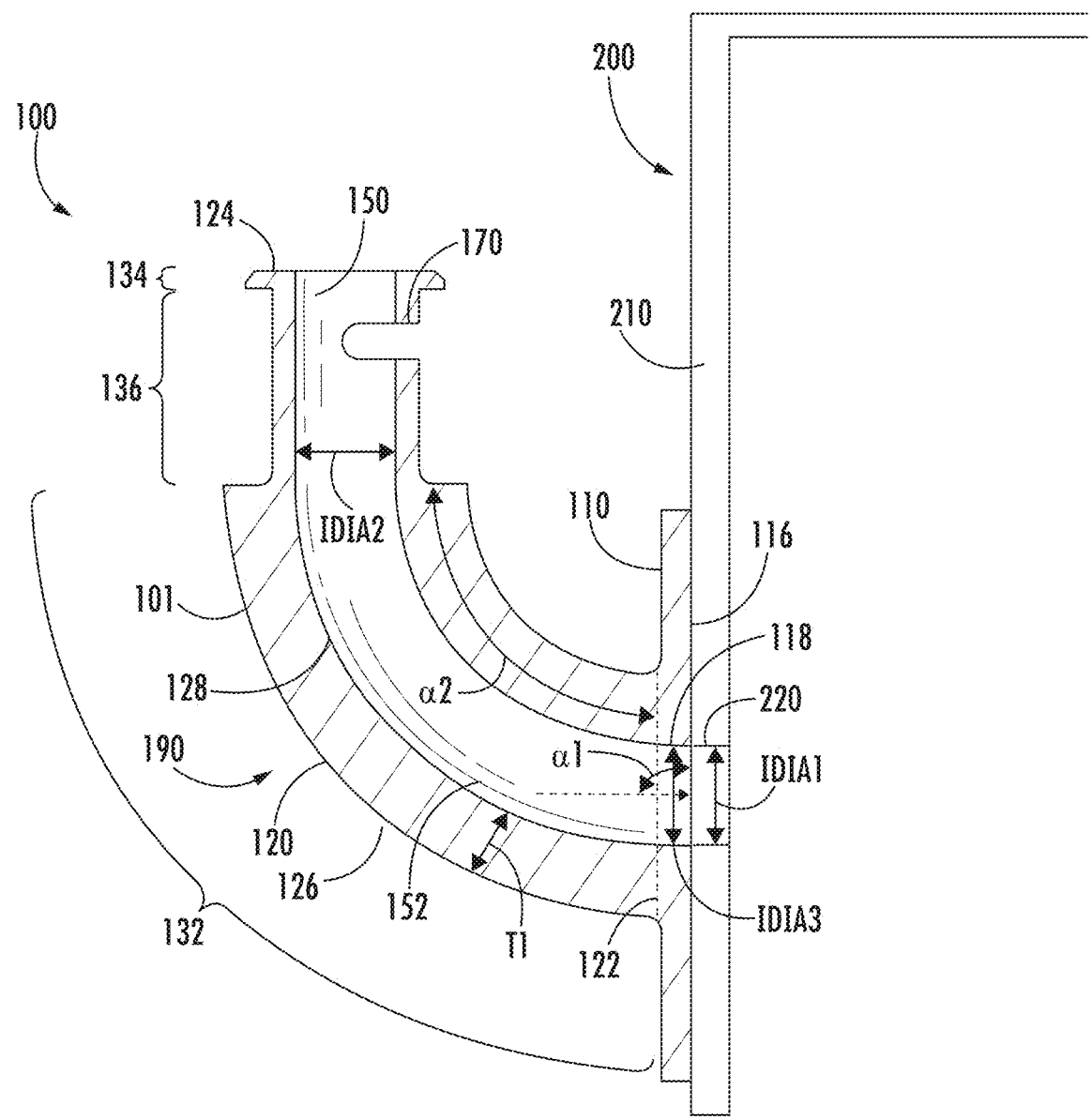
FIG. 3 is a cross-sectional view of the opening shield assembly and the housing of FIG. 1, according to an embodiment of the present disclosure.

Referring now to FIG. 3, with continued reference to FIGS. 1 and 2, a cross-sectional side view of the opening shield assembly 100 is illustrated, according to an embodiment of the present disclosure. The passageway 150 within the passageway portion 120 extends from the proximal end 122 to the distal end 124.

The passageway 150 may have an inner diameter IDIA2. The inner diameter IDIA2 of the passageway 150 may remain constant from the proximal end 122 to the distal end 124. The base plate 110 may be have a through-passage 118 connected to the passageway 150. The through-passage 118 connects the passageway 150 to the opening 220 when the opening shield assembly 100 is installed on the housing 200. The through-passage 118 may have an inner diameter IDIA3 equivalent to the inner diameter IDIA2 as the passageway 150.

The passageway 150 and the through-passage 118 combine to form one continuous passage 152 from the distal end 124 of the passageway portion 120 to the back side 116 of the base plate 110. The passage 152 is configured to align with the opening 220 in the housing wall 210 of the housing 200 when the opening shield assembly 100 is installed on the housing 200. The passage 152 is fluidly connected to the opening 220 in the housing wall 210 at the base plate 110.

The inner diameter IDIA2 of the passageway 150 may be equivalent to or greater than the inner diameter IDIA1 of the opening 220.

The passageway portion 120 includes an outward surface 126 and an inward surface 128. The inward surface 128 defines the passage 152 within the passageway portion 120.

The first portion 132 of the passageway portion 120 has a thickness T1 as measured from the inward surface 128 to the outward surface 126. The thickness T1 may remain constant in the first portion 132. The inward surface 128 defines the passage 152 within the passageway portion 120. The thickness T1 is large enough to shield the opening 220 from radiation from an angle α1 outside of the housing 200. The angle α1 may be between 0-180° as measured relative to the housing wall 210 of the housing 200 at opening 220, as illustrated in FIG. 3. The magnitude of the thickness TI may be driven by the amount of radiation shielding required internal the housing 200 to protect the encased electronics which have varying degrees of radiation susceptibility based on part type.

The body portion 101 may include a slot 170 passing through the body portion 101 to the passage 152. The slot 170 is configured to receive a zip tie 310 (see FIG. 4) to secure wires 252 and cable jackets 280 (see FIG. 4) within the passageway 150. Advantageously, the zip tie 310 helps provide some strain relief for the wire 252 by squeezing the wire 252 to the inward surface 128 of the third portion 136 within the slot 170.

The slot 170 is located within the third portion 136 of the body portion 101. The slot 170 extends from the inward surface 128 to the outward surface 126. The slot 170 may extend circumferentially around a portion of the third portion 136 but not completely circumferentially around the third portion 136, as illustrated in FIG. 3.

As illustrated in FIG. 3, the passageway portion 120 may be bent between the proximal end 122 and the distal end 124 to form a bend 190. Advantageously, the bend 190 helps better protect the opening 220 radiation. This bend 190 may be rounded, as shown in FIG. 3, and may also be referred to as an elbow. The bend 190 may have a bend radius α2 of about 90° between the proximal end 122 and the distal end 124. The bend 190 is not limited to a bend radius α2 of about 90° but may have any bend radius that allows a line of sight through the hemisphere 600 to always have a thickness T1 that allows from radiation protection.

Figure 4:
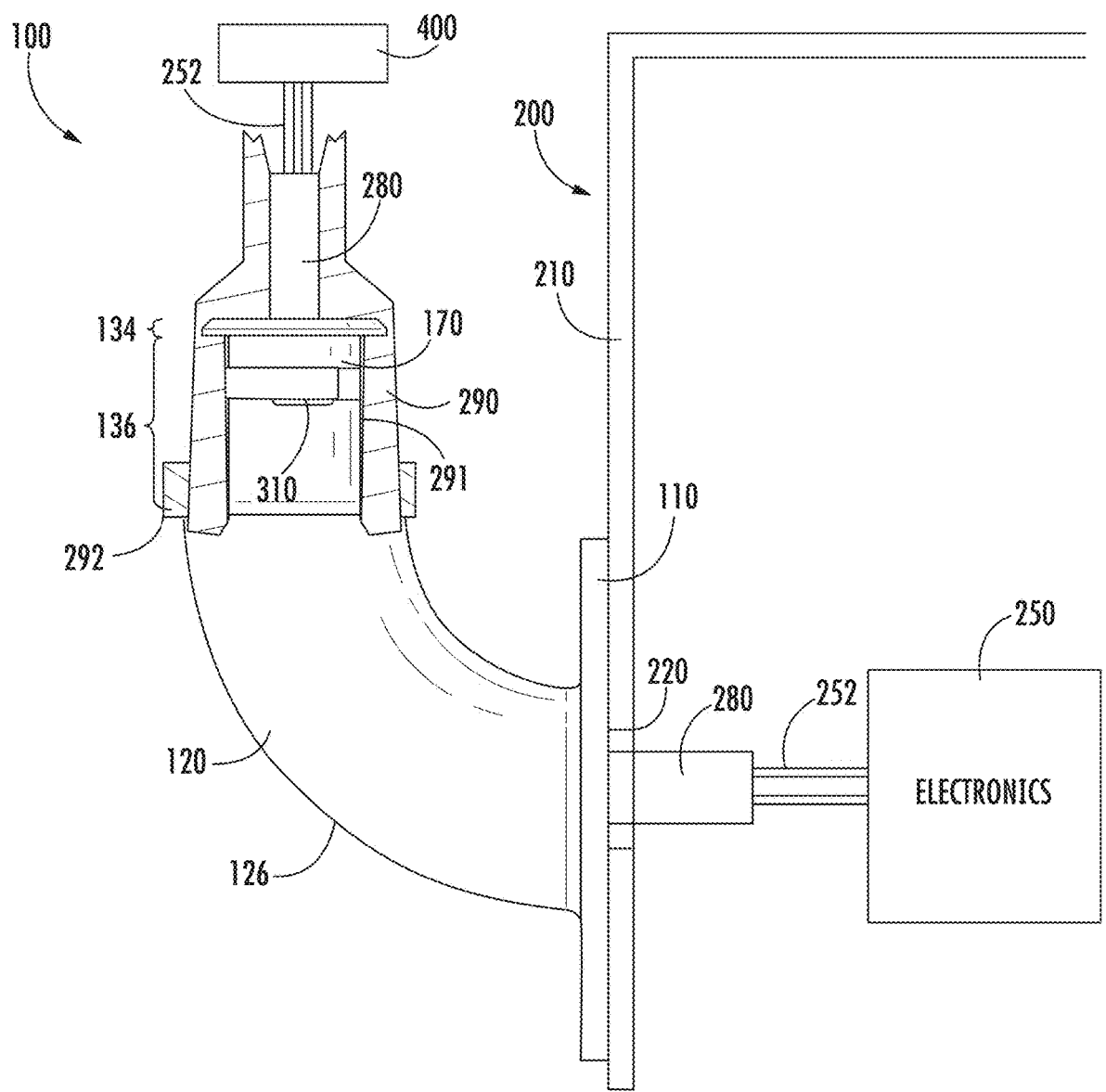
FIG. 4 is a side view of the opening shield assembly and a cut-away view of the housing of FIG. 1, according to an embodiment of the present disclosure.

Referring now to FIG. 4, with continued reference to FIGS. 1-3, a side view of the opening shield assembly 100 and a cut-away view of the housing 200 is illustrated, according to an embodiment of the present disclosure. Visible in FIG. 4 are the electronics 250 located within the housing 200. Cables or wires 252 extend from the electronics 250 through the opening 220 in the housing wall 210 and then through the passage 152 (see FIG. 3) of the opening shield assembly 100. The wires 252 may extend through the passage 152 of the opening shield assembly 100 to connect through a second set of electronics, a power source that may be contained within a second housing 400, wiring connection via soldering, a wiring connector, a wiring panel, or any other electrical connection known to one of skill in the art.

As illustrated in FIG. 4, the opening shield assembly 100 further includes cable jacket 280. The cable jacket 280 wraps around the wires 252 to provide extra thickness, shielding, and protection to the wires 252 within the opening shield assembly 100.

As illustrated in FIG. 4, the opening shield assembly 100 further includes a metallic over braid 290 configured to cover the cable jacket 280 and/or the passageway portion 120. The metallic over braid 290 is configured to cover the second portion 134 and the third portion 136 of the passageway portion 120. The opening shield assembly 100 may also include a band clamp 292 that is configured to compress the metallic over braid 290 onto the passageway portion 120. The band clamp 292 may be configured to compress the metallic over braid 290 onto the second portion 134 and/or the third portion 136 of the passageway portion 120. In an embodiment, an inner surface 291 of the metallic over braid 290 may be shaped to match an outward surface 126 of the passageway portion 120 at the third portion 136 and the second portion 134.

A zip tie 310 may be inserted through the slot 170 and wrap between the metallic over braid 290 and the outward surface 126 to compress the wires 252 and/or the cable jacket 280 into the passageway 150 in order to secure the wires 252 to the passageway 150.

Figure 5:
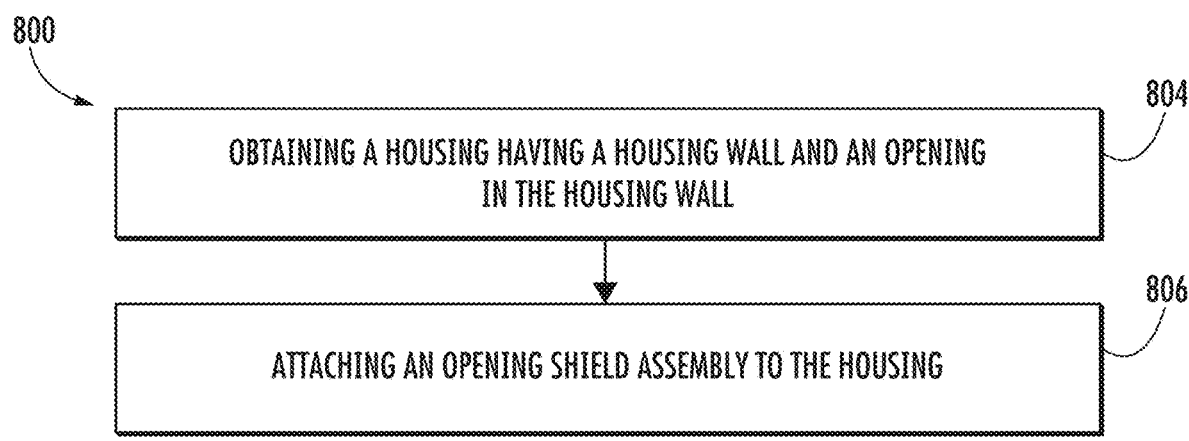
FIG. 5 is a flow chart of a method of assembly the electrical component protection assembly of FIG. 1, according to an embodiment of the present disclosure.

Referring now to FIG. 5, with continued reference to FIGS. 1-4, a flow chart of a method 800 of assembling an electrical component protection assembly 500 is illustrated, in accordance with an embodiment of the disclosure.

At block 804, a housing 200 having a housing wall 210 and an opening 220 in the housing wall 210 is obtained.

At block 806, an opening shield assembly 100 is attached to the housing 200. The opening shield assembly 100 includes a body portion 101. The body portion 101 includes a base plate 110 having a front side 114, a back side 116, and a passageway portion 120 having a proximal end 122 and a distal end 124. The passageway portion 120 being connected to the base plate 110 at the proximal end 122. The body portion 101 further including a passage 152 extending from the distal end 124 of the passageway portion 120 to the back side 116 of the base plate 110 through the passageway portion 120 and the base plate 110. The passage 152 connecting with the opening 220 in the housing wall 210 at the base plate 110. The passageway portion 120 is bent between the proximal end 122 and the distal end 124 to form a bend 190.

The method 800 may further include forming the body portion 101 of the opening shield assembly 100. The method 800 may also further include assembling the opening shield assembly 100, which may include: attaching a cable jacket 280 to a wire 252, inserting the wire 252 through the passage 152, covering the wire 252 using a metallic over braid 290, clamping the metallic over braid 290 onto the passageway portion 120 using a band clamp 292, and inserting a zip tie 310 through a slot 170 and securing the wire 252 to the passageway portion 120.

Technical effects and benefits of the features described herein include an opening shield assembly that is bent over or from an opening in an electrical component housing to shield the opening from EMI, RFI, and total dose radiation.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An opening shield assembly, comprising:
    a body portion comprising:
        a base plate having a front side and a back side;
        a passageway portion having a proximal end and a distal end, the passageway portion being connected to the base plate at the proximal end; and
        a passage extending from the distal end of the passageway portion to the back side of the base plate through the passageway portion and the base plate,
        wherein the passageway portion is bent between the proximal end and the distal end to form a bend; and
    a metallic over braid configured to cover the passageway portion;
    wherein the passageway portion further comprises:
        a first portion located at the proximal end, the first portion having a first outer diameter;
        a second portion located at the distal end, the second portion having a second outer diameter; and
        a third portion located between the first portion and the second portion, the third portion having a third outer diameter that is less than at least one of the first outer diameter and the second outer diameter;
    wherein the assembly further includes a band clamp that is configured to compress the metallic over braid onto the second portion and the third portion.

2. The opening shield assembly of claim 1, wherein the metallic over braid is configured to cover the second portion and the third portion.

3. The opening shield assembly of claim 1, wherein the body portion further comprises a slot passing through the body portion to the passage.

4. The opening shield assembly of claim 3, wherein the slot is located in the third portion.

5. The opening shield assembly of claim 1, wherein the second portion has a beveled edge or a chamfered edge at the distal end.

6. The opening shield assembly of claim 1, wherein the second portion has a fourth outer diameter at the distal end, wherein the second outer diameter of the second portion is located where the second portion meets the third portion, and wherein the fourth outer diameter is less than the second outer diameter.

7. The opening shield assembly of claim 1, wherein the bend has a bend radius of about 90°.

8. The opening shield assembly of claim 1, wherein the passageway portion further comprises an outward surface and an inward surface, the inward surface defining the passage within the passageway portion, and
   wherein a thickness as measured between the inward surface and the outward surface is constant within the first portion.

9. An electrical component protection assembly, comprising:
   a housing having a housing wall and an opening in the housing wall; and
   an opening shield assembly attached to the housing, the opening shield assembly comprising:
      a body portion comprising:
         a base plate having a front side and a back side;
         a passageway portion having a proximal end and a distal end, the passageway portion being connected to the base plate at the proximal end; and
      a passage extending from the distal end of the passageway portion to the back side of the base plate through the passageway portion and the base plate, the passage connecting with the opening in the housing wall at the base plate,
      wherein the passageway portion is bent between the proximal end and the distal end to form a bend
   wherein the passageway portion further comprises:
   a first portion located at the proximal end, the first portion having a first outer diameter;
   a second portion located at the distal end, the second portion having a second outer diameter; and
   a third portion located between the first portion and the second portion, the third portion having a third outer diameter that is less than at least one of the first outer diameter and the second outer diameter;
   wherein the assembly further comprises:
   a metallic over braid configured to cover the passageway portion; and
   a band clamp that is configured to compress the metallic over braid onto the passageway portion.

10. A method of assembling an electrical component protection assembly, comprising:
   obtaining a housing having a housing wall and an opening in the housing wall;
   attaching an opening shield assembly according to claim 1 to the housing.

11. A method of assembling an electrical component protection assembly as recited in claim 9, the method comprising:
   obtaining the housing; and
   attaching the opening shield assembly to the housing.

\* \* \* \* \*